United States Patent [19]

Willer

[11] Patent Number: 5,240,523
[45] Date of Patent: Aug. 31, 1993

[54] BINDERS FOR HIGH-ENERGY COMPOSITON UTILIZING CIS-,CIS-1,3,5-TRI (ISOCYANATOMETHYL) CYCLOHEXANE

[75] Inventor: Rodney L. Willer, Newark, Del.

[73] Assignee: Thiokol Corporation, Ogden, Utah

[21] Appl. No.: 217,485

[22] Filed: Jul. 11, 1988

[51] Int. Cl.$^5$ .............................................. C06B 45/10
[52] U.S. Cl. ................................................... 149/19.4
[58] Field of Search ........................................ 149/19.4

[56] References Cited

U.S. PATENT DOCUMENTS

| | | | |
|---|---|---|---|
| 4,072,702 | 2/1978 | Haskins | 260/453 AB |
| 4,338,256 | 7/1982 | Fujinami et al. | 260/453 |
| 4,379,903 | 4/1983 | Reed et al. | 528/55 |
| 4,454,296 | 6/1984 | Fujinami et al. | 528/75 |
| 4,456,493 | 6/1984 | Barnes et al. | 149/19.4 |
| 4,483,978 | 11/1984 | Manser | 528/408 |
| 4,706,567 | 11/1987 | Schmid et al. | 149/19.4 |
| 4,726,919 | 2/1988 | Kristofferson et al. | 149/19.4 |
| 4,799,980 | 1/1989 | Reed | 149/19.4 |

*Primary Examiner*—Edward A. Miller
*Attorney, Agent, or Firm*—Kevin E. Joyce; Ronald L. Lyons; Kendrew H. Colton

[57] ABSTRACT

Propellant compositions have an elastomeric binder formed by curing a hydroxyl-terminated polyether or polyester prepolymer with cis-,cis-1,3,5-tri(isocyanatomethyl) cyclohexane. The propellant compositions also include high-energy particulates and high-energy plasticizers. The use of cis-cis-1,3,5-tri(isocyanatomethyl)cyclohexane increases the energy of the propellant per binder weight and in several cases substantially improves the mechanical characteristics of the propellant composition.

9 Claims, No Drawings

BINDERS FOR HIGH-ENERGY COMPOSITON UTILIZING CIS-,CIS-1,3,5-TRI (ISOCYANATOMETHYL) CYCLOHEXANE

The present invention is directed to high-energy compositions having elastomeric binders, and particularly to such compositions in which the elastomeric binder utilizes cis-,cis-1,3,5-tri(isocyanatomethyl)cyclohexane (TIMC) as a curative.

BACKGROUND OF THE INVENTION

High-energy solid compositions, such as solid propellants, explosives, gasifiers or the like, comprise an elastomeric binder in which is dispersed particulate solids, such as particulate fuel material and/or particulate oxidizers. High-energy compositions typically include a liquid plasticizer, such as a nitrate ester plasticizer, which contributes to the elastomeric characteristics of the binder and adds energy to the composition.

Of particular interest herein are cross-linked elastomers formed from a hydroxyl-terminated polyester or polyether prepolymer plus a curative. Examples of relatively non-energetic polyester and polyether prepolymers are polyethylene glycol (PEG), polycaprolactone (PCP), and polydiethylene glycol adipate (PGA). An example of an energetic prepolymer is Glycidyl Azide Polymer (GAP).

Polyethers useful as prepolymers for binders may be formed by polymerizing oxetanes having pendant groups, as described in U.S. Pat. No. 4,483,978, issued to Manser. Energetic pendant groups, e.g., cyano, azido, and nitrato, contribute to the energy of the prepolymer and the binder and compositions formed therefrom.

Hydroxyl-terminated polyethers and polyesters useful as prepolymers in high-energy compositions typically have functionalities of about 2, i.e., the functionality provided by the terminal hydroxyl groups. For an elastomer to function as a binder in a high-energy composition, substantial networking must be established with a curative, and a curative having a functionality substantially higher than 2 is required, preferably in the range of about 3.

The standard polyfunctional polyisocyanate used today in high-energy compositions, such as propellants, is Mobay's Desmodur N-100 TM (hereinafter N-100). N-100 is synthesized by the controlled reaction of hexamethylene diisocyanate with water. The result is a mixed product, and several studies have indicated that there are at least four principal products in N-100. The functionality of N-100 is approximately 3.5.

Although N-100 has proven to be a useful and effective curative for propellant compositions, there are problems with N-100 which might be addressed by a different curative. The 3.5 functionality of N-100 is higher than the more ideal functionality of 3.0 for hydroxyl-terminated prepolymers, resulting in excessive cross-linking in certain cases. Biuret groups formed in the synthesis of N-100 are stiff because of hydrogen bonding, and this is believed to reduce propellant mechanical properties. N-100 has a high equivalent weight (molecular weight per functional group), i.e., about 197; as N-100 is non-energetic, weight is added without adding energy. Being that N-100 is a mixed product, there is undesirably high variability from lot to lot.

It has been proposed to increase propellant performance by switching to a lower molecular weight, purely trifunctional isocyanate. 1,3,5-triisocyanatopentane (PTI) has been proposed for this purpose. Unfortunately, while some binders appeared promising, PTI proved unable to cross-link certain prepolymers, particularly GAP, which would not react with the secondary isocyanate group in PTI.

The need exists for improved isocyanate cross-linking agents for use in high-energy binders, particularly for solid propellant binders.

SUMMARY OF THE INVENTION

In accordance with the present invention, high-energy compositions, particularly solid propellants, are formed with a binder that includes a hydroxyl-terminated polyether or polyester and TIMC as a curative. The propellant composition also contains a particulate fuel material, a particulate oxidizer, and a plasticizer. The compositions have enhanced energy relative to similar compositions utilizing N-100 as the curative and in some cases exhibit substantially improved mechanical characteristics.

DETAILED DESCRIPTION OF CERTAIN PREFERRED EMBODIMENTS

Herein it is found that cis,cis-1,3,5-tri(isocyanatomethyl)cyclohexane (TIMC) is useful in high-energy compositions as a curative for hydroxyl-terminated polyethers and polyesters. Advantages of propellants utilizing TIMC include enhanced energy per weight and enhanced mechanical properties.

TIMC and its synthesis are described in U.S. Pat. No. 4,454,296, the teachings of which are incorporated herein by reference.

TIMC may be used in any high-energy composition where an isocyanate curative, such as N-100, is presently used. Of most interest for purposes of this invention are propellant formulations in which the elastomeric binder is formed from a polyether or polyester, such as PEG, PCP, PGA, GAP, and polyethers formed from oxetanes and/or tetrahydrofuran, as described in the above-identified U.S. Pat. No. 4,483,970, the teachings of which are incorporated herein by reference.

A primary purpose of an elastomeric binder is to retain and spatially immobilize high-energy particulates distributed throughout. Such high-energy solids include fuel particulates and/or oxidizer particulates. It is a general object in formulating propellant compositions to provide as high a percentage of such solids as in consistent with good mechanical characteristics. Generally propellants contain between about 60 and about 90 wt. percent fuel and oxidizer particulate solids. A typical particulate fuel material is finely divided aluminum. Particulate oxidizer materials include but are not limited to ammonium perchlorate (AP), cyclotetramethylene tetranitramine (HMX), cyclotrimethylene trinitramine (RDX), and mixtures thereof.

Substantially the remainder of the high-energy composition consists of matrix material, which includes the elastomeric binder and plasticizers therefor. Most polyether-based and polyester-based elastomeric binders are miscible with high-energy nitrate ester plasticizers. Nitrate ester plasticizers provide substantial energy to the composition, and it is generally desirable to provide as high a plasticizer to polymer ratio (Pl/Po) as is consistent with required mechanical properties of the matrix. Typically plasticizer-to-polymer ratios range from about 1.5:1 to about 3:1. Nitroester plasticizers include, but are not limited to, nitroglycerine (NG); mono-, di-, and triethyleneglycol dinitrate, butanetriol trinitrate (BTTN); and trimethylolethane trinitrate (TMETN).

Polyethers and polyesters are tailored to have number average molecular weights of from about 2,000 to about 20,000, although lower molecular weight polyethers may be preferred for certain purposes. The amount of TMIC used to cure the prepolymer is adjusted to attain a desired cure ratio (NCO/OH). The NCO/OH ratio is selected to achieve a desired cross-linked density, which typically ranges from about 5 percent to about 15 percent. Generally, the NCO/OH ratio ranges from about 0.8 to about 2. Adjustments in the NCO/OH ratio affect strain and stress characteristics, higher ratios providing better stress and lower ratios providing better strain. Cross-linking density can also be adjusted by additional cross-linking agents, such as trimethylol propane (TMP).

The propellant composition, as is known in the art, may also contain minor amounts of additional ingredients, such as flow control agents, cure catalysts, viscosity modifiers, etc. Such additional components may comprise up to about 5 wt. percent of the propellant composition.

High-energy compositions using TIMC are formulated and prepared in the usual manner. The ingredients are thoroughly blended in a mixer and then cast into an appropriate mold, e.g., a rocket motor and allowed to cure. Generally, in casting rocket motors or the like, it is problematic to cast the propellant mixture before substantial curing takes place, making the propellant mixture unworkable. TIMC effects a sufficiently slow cure that it is useful for preparing cast propellants.

Various aspects of the invention will now be described in greater detail by way of specific examples:

EXAMPLE 1

Three PGA-based propellants were formulated, one using N-100 as the curing agent and two using TIMC as the curing agent. The propellants were formulated with identical or substantially identical plasticizer percentages, Pl/Po ratios, NCO/OH ratios, and total solids percent.

Table 1 below sets forth the components and properties of the three propellant compositions.

TABLE 1

|  | Mix No. PT- | | |
|---|---|---|---|
|  | 1188 | 1263 | 1059 |
| Polymer | PGA | PGA | PGA |
| Plasticizer, % | 20.5 | 20.5 | 20.5 |
| Curing Agent | N-100 | TIMC | TIMC |
| Pl/Po | 3.0 | 3.0 | 3.0 |
| NCO/OH | 1.2 | 1.2 | 1.3 |
| Total Solid, % | 72 | 72 | 72 |
| EOM Viscosity Kp/°F. | 28/100 | 56/105 | 58102 |
| Mechanical |  |  |  |
| Eo, psi | 324 | 534 | 543 |
| σ$_m$, psi | 83 | 105 | 112 |
| ε$_m$/ε$_r$, % | 28/29 | 20/21 | 25/26 |

Eo = modulus (work to deform)
σ$_m$ = stress
ε$_m$/ε$_r$ = strain (maxiumum)/strain (at rupture)

It is to be noted that by using TIMC, a substantial improvement in stress properties is achieved with little cost in strain properties. It is also to be noted that the same or slightly increased NCO/OH ratio is achieved, using a significantly smaller total weight of curative than when N-100 is used. As the curative is relatively low energy, this reduction in weight provides the propellant compositions formed using TIMC with increased energy per weight.

EXAMPLE 2

| Component | Weight, % |
|---|---|
| GAP | 8.86 |
| TIMC | 0.93 |
| V$_2$O$_5$ | 0.50 |
| C | 0.50 |
| MNA | 0.75 |
| BTTN | 22.77 |
| TMETN | 7.59 |
| AN 70μ | 58.00 |
| TPB | 0.10 |
|  | 100.00 |

Properties of the formulation are set forth in Table 2 below:

TABLE 2

| Mix No. PT-1278 | |
|---|---|
| Polymer | GAP |
| Plasticizer, % | 30.36 |
| Curing Agent | TIMC |
| Pl/Po | 3.1 |
| NCO/OH | 1.7 |
| Total Solid, % | 59 |
| EOM Viscosity Kp/°F. | 2/98 |
| Mechanical |  |
| Eo, psi | 198 |
| σ$_m$, psi | 36 |
| ε$_m$/ε$_r$, % | 16/16 |

Eo = modulus (work to deform)
σ$_m$ = stress (maximum
ε$_m$/ε$_r$ = strain (maximum)/strain (at rupture)

EXAMPLE 3

A PCP propellant containing cyclotetramethylene tetranitramine (HMX) and a propellant containing cyclotrimethylene trinitramine (RDX) are formulated as follows:

|  | Propellant Formulations Percent | | |
|---|---|---|---|
| Ingredient | HMX Propellant | RDX Propellant | Function |
| PCP(DEG) 6000 | 8.347 | 7.105 | Prepolymer |
| BTTN | 13.358 | 12.920 | Plasticizer |
| TMETN | 4.453 | 4.31 | Plasticizer |
| MNA | 0.25 | 0.25 | Stabilizer |
| Al (60μ) | 17 | 17 | Fuel |
| HMX (20μ) | 30 | — | Oxidizer |
| HMX (3.2μ) | 16 | — | Oxidizer |
| RDX (13μ) | — | 36.51 | Oxidizer |
| RDX (3.2μ) | — | 13.49 | Oxidizer |
| AP (200μ) | 10.00 | 8.00 | Oxidizer |
| TIMC | (.557) | (.380) | Curative |
| TPB | 0.01 | 0.01 | Cure Catalyst |
| CAB | 0.025 | 0.025 | Crosslinker |

PCP(DEG) 6000=polycaprolactone MW 6000, derived from diethylene glycol, functionality 2.1; BTTN=butanetriol trinitrate; TMETN=trimethylol ethane trinitrate; MNA=(N-methyl-2-nitro aniline, Al=particulate aluminum; AP=ammonium perchlorate; TPB=triphenylbismuth; and CAB=cellulose acetate butyrate.

These formulations are prepared by the following procedure:

The required quantity of binder components, including poly(caprolactone) polymer, BTTN, and TMETN nitrate ester plasticizers, MNA, and aluminum are added to a warm (130° F.) mix bowl and stirred for 5 minutes. The mix bowl is lowered, and the material remaining on the mix blades and at the top portion of the mix bowl is removed with a Teflon ® spatula and placed in the bottom of the mix bowl. This process is referred to as a scrape-down procedure. One half of the HMX and all of the AP is added to the mix bowl, and the contents are mixed for 15 minutes. The mix bowl is lowered, the mix blades and bowl scraped own, and the remaining HMX added to the mix bowl. The contents are mixed for 10 minutes, removed from the mix bowl, and stored at 130° F. for 3 to 5 days. This material is designated as the propellant prebatch.

The required amount of propellant prebatch is added to the warm (130° F.) mix bowl and mixed under vacuum for 90 minutes. TIMC and TPB are added and warm, vacuum mixing continued for 30 minutes. The propellant is cast into a 1×4×4 inch carton and cured at 130° F. for 6 days.

The aluminated, ammonium perchlorate-(HMX or RDX) oxidized high-energy nitro ester plasticized propellant compositions represent typical propellants designed for tactical motor use.

TIMC provides improved mechanical characteristics to a propellant composition in several instances, presumably because its symmetrical configuration provides improved network formation. TIMC has one of the lowest molecular weights of a multiple functional isocyanate and provides three primary, non-hindered isocyanate groups. Furthermore, unlike N-100, TIMC is a pure compound and its curative properties are uniform from lot to lot.

While the invention has been described in terms of certain preferred embodiments, modifications obvious to one with ordinary skill in the art may be made without departing from the scope of the present invention.

Various features of the invention are set forth in the following claims:

What is claimed:

1. A solid, high-energy composition comprising particulate fuel material, particulate oxidizer material, and an elastomeric binder, said elastomeric binder being formed from a hydroxyl-terminated polyether or polyester prepolymer cured with cis-,cis-1,3,5-tri(isocyanatomethyl)cyclohexane.

2. A composition according to claim 1 wherein said particulate material comprises between about 60 and about 90 wt. percent of said high-energy composition.

3. A composition according to claim 1 wherein said TIMC and said hydroxyl-terminated prepolymer are used at an NCO/OH ratio of between about 0.8 and about 2.

4. A composition according to claim 1 also including a plasticizer for said elastomeric binder.

5. A composition according to claim 4 wherein said plasticizer is a nitrate ester plasticizer.

6. A composition according to claim 4 having a plasticizer-to-polymer ratio of between about 1.5:1 and about 3:1.

7. A composition according to claim 1 wherein said prepolymer is selected from the group consisting of polyethylene glycol, polycaprolactone, polydiethylene glycol adipate, glycidal azide polymer, and polymers and copolymers of oxetanes and tetrahydrofuran.

8. A composition according to claim 1 wherein said prepolymer is polydiethylene glycol adipate or glycidal azide polymer.

9. A solid, high-energy composition comprising between about 60 and about 90 wt. percent of high-energy particulate material, including fuel particulates and oxidizer particulates, balance matrix material including an elastomeric binder and a plasticizer therefore, said binder being formed of a hydroxyl-terminated polyether or polyester prepolymer cured with cis-cis-1,3,5-tri(isocyanatomethyl)cyclohexane said prepolymer and cis-cis-1,3,5-tri(isocyanatomethyl)cyclohexane providing an NCO/OH ratio of between about 1.1 and about 2, said matrix material having a plasticizer to polymer ratio of between about 1.5:1 and about 3:1.

* * * * *